United States Patent
Hart et al.

(10) Patent No.: US 7,626,969 B2
(45) Date of Patent: Dec. 1, 2009

(54) RELATIVE LOCATION OF A WIRELESS NODE IN A WIRELESS NETWORK

(75) Inventors: Brian Donald Hart, Sunnyvale, CA (US); Bretton Lee Douglas, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 338 days.

(21) Appl. No.: 11/542,739

(22) Filed: Oct. 4, 2006

(65) Prior Publication Data

US 2008/0084858 A1    Apr. 10, 2008

(51) Int. Cl.
*H04L 12/58* (2006.01)

(52) U.S. Cl. .................. 370/338; 375/259; 342/453; 342/450; 342/457; 342/463; 455/456

(58) Field of Classification Search .................. 455/456
See application file for complete search history.

(56) References Cited

U.S. PATENT DOCUMENTS

| | | | |
|---|---|---|---|
| 4,254,467 A | 3/1981 | Davis et al. | |
| 5,028,848 A | 7/1991 | Bankston et al. | |
| 5,327,144 A | 7/1994 | Stilp et al. | |
| 5,394,158 A | 2/1995 | Chia | |
| 5,396,582 A | 3/1995 | Kahkoska | |
| 5,564,079 A | 10/1996 | Olsson | |
| 5,570,412 A | 10/1996 | LeBlanc .................. 455/456.2 |
| 5,666,662 A | 9/1997 | Shibuya | |
| 5,717,406 A | 2/1998 | Sanderford et al. ......... 342/457 |
| 5,732,354 A | 3/1998 | MacDonald | |
| 6,112,095 A | 8/2000 | Wax et al. | |
| 6,115,605 A | 9/2000 | Siccardo et al. | |
| 6,134,338 A | 10/2000 | Solberg et al. | |
| 6,134,448 A | 10/2000 | Shoji et al. | |
| 6,140,964 A | 10/2000 | Sugiura et al. | |
| 6,167,274 A | 12/2000 | Smith | |
| 6,198,935 B1 | 3/2001 | Saha et al. | |
| 6,212,391 B1 | 4/2001 | Saleh et al. | |
| 6,226,400 B1 | 5/2001 | Doll | |
| 6,236,365 B1 | 5/2001 | LeBlanc et al. | |
| 6,243,811 B1 | 6/2001 | Patel | |
| 6,249,252 B1 | 6/2001 | Dupray | |

(Continued)

OTHER PUBLICATIONS

Notification of Transmittal of the International Search Report and the Written Opinion of the International Searching Authority, or the Declaration; PCT/US07/79354, dated Mar. 14, 2008.

*Primary Examiner*—Vincent P Harper
*Assistant Examiner*—Natasha Cosme
(74) *Attorney, Agent, or Firm*—Baker Botts L.L.P.

(57) ABSTRACT

In one embodiment, a method includes computing a probability surface corresponding to the location probability of the wireless node within a physical region based on the received signal strength data associated with a wireless node and an RF model of the physical region; computing, based on the probability surface, an aggregate probability (Pin) of the wireless node being inside a perimeter defined with the physical region; computing, based on the probability surface, an aggregate probability (Pout) of the wireless node being outside the perimeter; computing a probability ratio of the aggregate probabilities Pin to Pout; and determining whether the wireless node is inside or outside the perimeter based on a comparison of Pout and Pin.

27 Claims, 8 Drawing Sheets

U.S. PATENT DOCUMENTS

| | | |
|---|---|---|
| 6,269,246 B1 | 7/2001 | Rao et al. |
| 6,272,541 B1 | 8/2001 | Cromer et al. |
| 6,275,190 B1 | 8/2001 | Sugiura et al. |
| 6,282,427 B1 | 8/2001 | Larsson et al. |
| 6,304,218 B1 | 10/2001 | Sugiura et al. |
| 6,317,599 B1 | 11/2001 | Rappaport et al. |
| 6,317,604 B1 | 11/2001 | Kovach et al. |
| 6,414,634 B1 | 7/2002 | Tekinay |
| 6,415,155 B1 | 7/2002 | Koshima et al. |
| 6,441,777 B1 | 8/2002 | McDonald |
| 6,456,892 B1 | 9/2002 | Dara-Abrams et al. |
| 6,526,283 B1 | 2/2003 | Jang |
| 6,556,942 B1 | 4/2003 | Smith |
| 6,581,000 B2 | 6/2003 | Hills et al. |
| 6,664,925 B1 | 12/2003 | Moore et al. |
| 6,674,403 B2 | 1/2004 | Gray et al. ............. 342/463 |
| 6,704,352 B1 | 3/2004 | Johnson |
| 6,728,782 B1 | 4/2004 | D'Souza et al. |
| 6,754,488 B1 | 6/2004 | Won et al. |
| 6,766,453 B1 | 7/2004 | Nessett et al. |
| 6,799,047 B1 | 9/2004 | Bahl et al. ............. 455/456.1 |
| 6,804,394 B1 | 10/2004 | Hsu |
| 6,842,726 B1 * | 1/2005 | Scharosch et al. .......... 703/13 |
| 6,850,946 B1 | 2/2005 | Rappaport et al. |
| 6,990,428 B1 | 1/2006 | Kaiser et al. ............ 702/150 |
| 2001/0022558 A1 * | 9/2001 | Karr et al. ............. 342/450 |
| 2001/0041576 A1 * | 11/2001 | I'Anson et al. ............ 455/456 |
| 2002/0045424 A1 | 4/2002 | Lee ............................ 455/41 |
| 2002/0102988 A1 | 8/2002 | Myllymaki |
| 2002/0115445 A1 | 8/2002 | Myllymaki |
| 2002/0118118 A1 | 8/2002 | Myllymaki et al. |
| 2002/0154134 A1 | 10/2002 | Matsui |
| 2002/0168958 A1 | 11/2002 | Ford et al. |
| 2002/0174335 A1 | 11/2002 | Zhang et al. |
| 2002/0176366 A1 | 11/2002 | Ayyagari et al. |
| 2003/0117985 A1 | 6/2003 | Fujii et al. |
| 2003/0130987 A1 | 7/2003 | Edlund et al. |
| 2003/0135486 A1 | 7/2003 | Edlund et al. |
| 2003/0135762 A1 | 7/2003 | Macaulay |
| 2004/0066757 A1 | 4/2004 | Molteni et al. ............. 370/329 |
| 2004/0072577 A1 | 4/2004 | Myllymaki et al. |
| 2004/0111397 A1 | 6/2004 | Chen et al. |
| 2004/0151377 A1 | 8/2004 | Boose et al. |
| 2004/0166878 A1 | 8/2004 | Erskine et al. ........... 455/456.1 |
| 2004/0176108 A1 | 9/2004 | Misikangas |
| 2004/0186847 A1 | 9/2004 | Rappaport et al. |
| 2004/0198373 A1 | 10/2004 | Ford et al. |
| 2004/0198392 A1 | 10/2004 | Harvey et al. ............ 455/456.1 |
| 2004/0203910 A1 | 10/2004 | Hind et al. ............... 455/456.1 |
| 2004/0236547 A1 | 11/2004 | Rappaport et al. |
| 2004/0259554 A1 | 12/2004 | Rappaport et al. |
| 2004/0259555 A1 | 12/2004 | Rappaport et al. |
| 2005/0128139 A1 | 6/2005 | Misikangas et al. |
| 2005/0131635 A1 | 6/2005 | Myllymaki et al. |
| 2005/0136944 A1 | 6/2005 | Misikangas et al. |
| 2005/0185615 A1 | 8/2005 | Zegelin ..................... 370/331 |

* cited by examiner

RELATIVE LOCATION OF A WIRELESS NODE IN A WIRELESS NETWORK

TECHNICAL FIELD

This disclosure relates generally to wireless networks.

BACKGROUND

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network. Radio frequency (RF) coverage maps, also referred to as a heat maps, provide information regarding coverage of particular wireless access points. RF coverage maps are useful for assessing the area or region of sufficient WLAN service, and for use in locating wireless nodes. RF coverage maps are typically derived from manual site surveys and mathematical modeling techniques, such as ray tracing. However, shadowing from nearby walls and furniture, and the multipath effects inherent to various RF environments, make high accuracy coverage maps difficult to achieve.

DESCRIPTION OF EXAMPLE EMBODIMENTS

A. Overview

Particular embodiments of the present invention are directed to determining the location of a wireless node relative to a defined area. According to one implementation, the location server determines whether a wireless node is located inside or outside a perimeter of a defined area (e.g., a building) based on a computed probability ratio. More specifically, in one implementation, the location server computes a probability surface corresponding to the location probability of the wireless node at various locations in a physical region based on received signal strength data associated with the wireless node. The location server then computes an aggregate probability (Pin) of the wireless node being inside a perimeter based on the probability surface, and computes an aggregate probability (Pout) of the wireless node being outside the perimeter based on the probability surface. The location server then computes a probability ratio of the aggregate probabilities Pin to Pout, and determines whether the wireless node is inside or outside the perimeter based on the probability ratio. In one implementation, the probability ratio may be biased based on a predefined policy. According to another implementation, the location server may exclude aggregate probabilities (i.e., Pin and Pout) within an exclusion region when computing the probability ratio Pout/Pin, and may modify the size of the exclusion region to bias the probability ratio.

B. Example Wireless Network System Architecture

B.1. Network Topology

Figure 1:
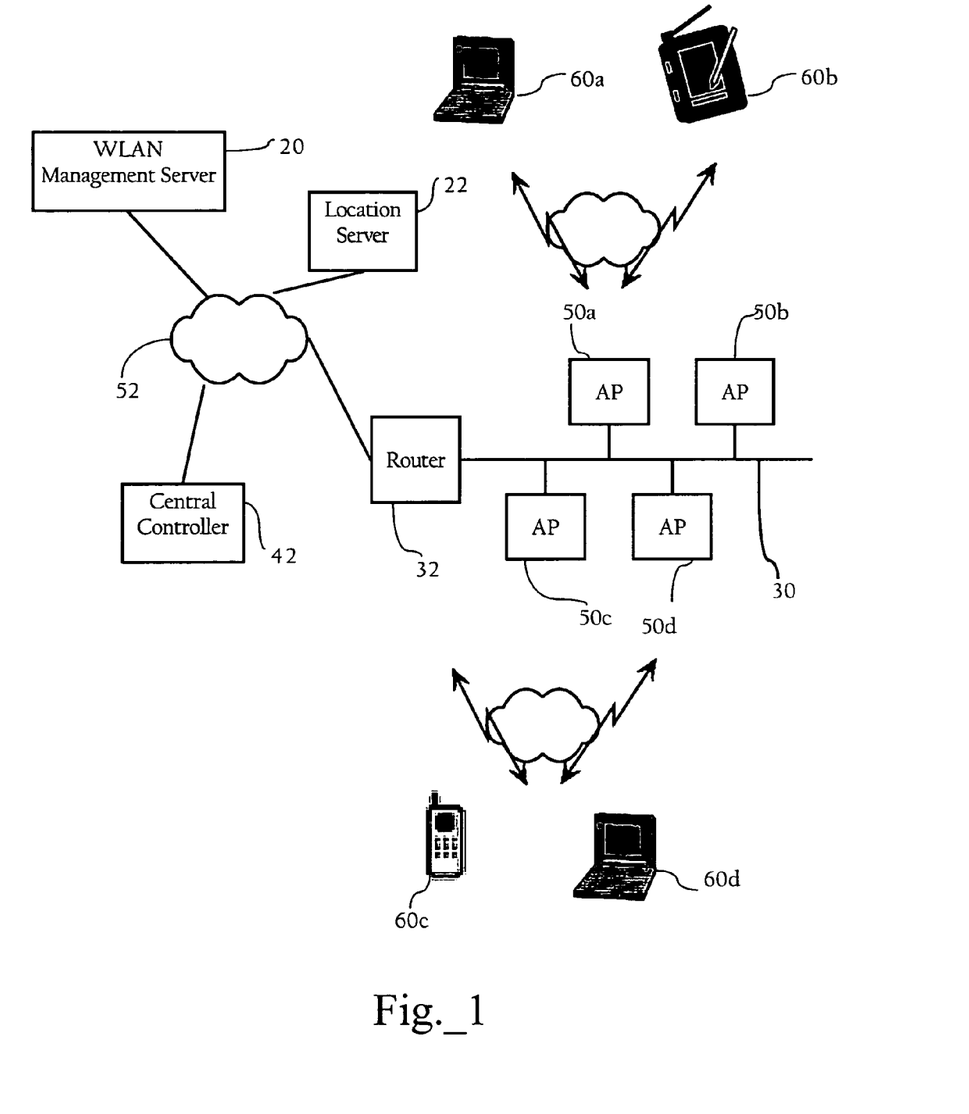
FIG. 1 illustrates example components in a wireless local area network (WLAN) system.

FIG. 1 illustrates example components in a wireless local area network (WLAN) system. In a specific embodiment of the present invention, the system includes a WLAN management server 20, a location server 22, and a central controller 42, a local area network (LAN) 30, a router 32, and wireless access points 50a, 50b, 50c, and 50d (collectively referred to as wireless access points 50). LAN 30 is implemented by a switch (or an array of switches) and/or other network devices, such as a bridge.

As FIG. 1 illustrates, these network elements are operably connected to a network 52. Network 52, in one implementation, generally refers to a computer network, such as a LAN, a WAN, etc., that includes one or more intermediate network devices (e.g., routers, switches, etc.), which allow for the transmission of messages between WLAN management server 20 and wireless nodes via wireless access points 50. Of course, network 52 can include a variety of network segments, transmission technologies and components, such as terrestrial WAN links, satellite links, optical fiber links, and cellular links. Network 52 could also be a campus LAN. LAN 30 may be a LAN, LAN segments implemented by an Ethernet switch (not shown), or an array of switches having multiple ports to which wireless access points 50 are connected. The wireless access points 50 are typically connected to switch ports via Ethernet links; however, other link layer connection protocols or communication means can be employed. FIG. 1 illustrates one possible network environment in which the invention may operate; however, other implementations are possible. For example, although WLAN management server 20 is illustrated as being on a different LAN or LAN segment, it may be co-located with wireless access points 50.

The wireless access points 50 are operative to wirelessly communicate with remote wireless node devices 60a, 60b, 60c, and 60d. In one implementation, the wireless access points 50 implement the wireless network protocol specified in the IEEE 802.11 WLAN specification; of course, other wireless network protocols may be used. The wireless access points 50 may be autonomous or so-called "fat" wireless access points, or light-weight wireless access points operating in connection with a wireless switch (not illustrated. In addition, the network infrastructure may also include a Wireless LAN Solution Engine (WLSE) offered by Cisco Systems, Inc. of San Jose, Calif. or another wireless network management system. In some implementations, the network infrastructure may also include one or more Wireless Control System (WCS) nodes operative to manage one or more wireless switches and access points.

B.2. Exemplary System Architecture for Location Server

Figure 2:
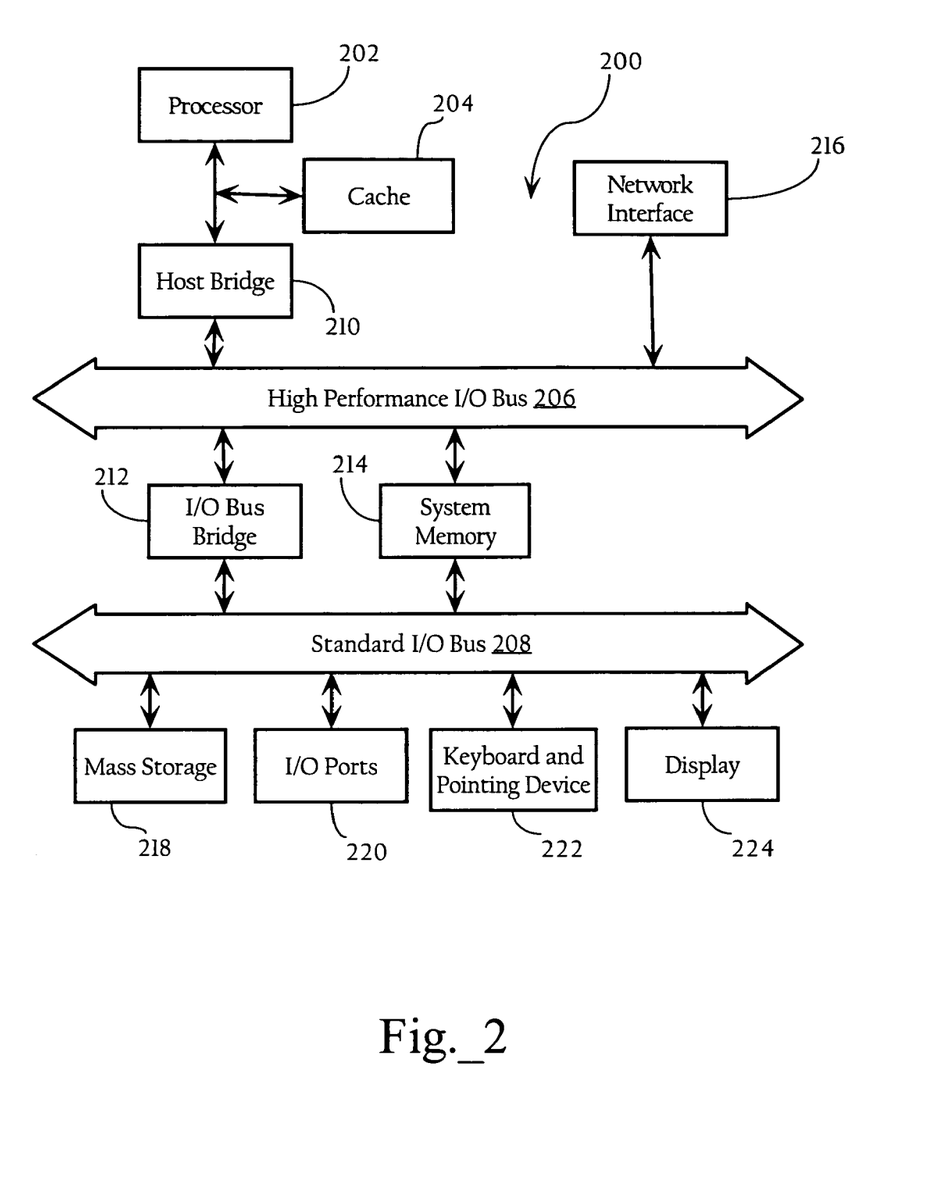
FIG. 2 illustrates an example computing system architecture that may be used to implement one or more aspects of the functionality described herein.

FIG. 2 illustrates an example computing system architecture, which may be used to implement a location server 22, which may be used to perform the location processes described below. In one implementation, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218, I/O ports 220, keyboard and pointing device 222, and display 224 couple to bus 208. Hardware system 200 may optionally include a keyboard and pointing device (not shown) coupled to bus 208. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the location server 22, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain implementations of the present invention may not require nor include all of the above components. For example, the peripheral devices shown coupled to standard I/O bus 208 may couple to high performance I/O bus 206. In addition, in some implementations only a single bus may exist, with the components of hardware system 200 being coupled to the single bus. Furthermore, hardware system 200 may include additional components, such as additional processors, storage devices, or memories.

As discussed below, in one embodiment, the operations of the location server 22 described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like.

C. Example Wireless Network Environment Having a Defined Perimeter

Figure 3:
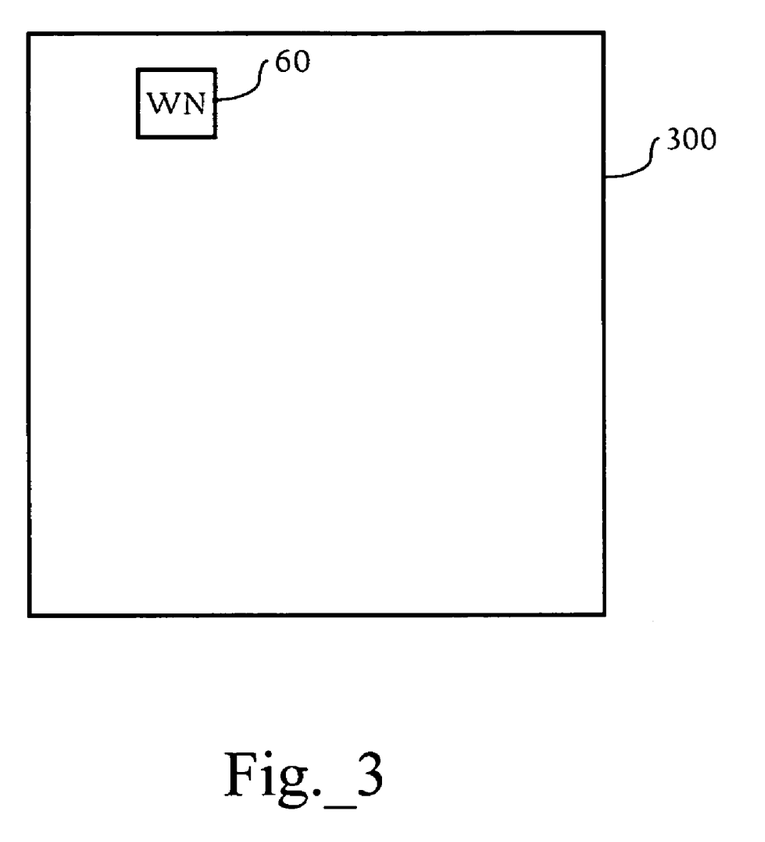
FIG. 3 illustrates an example physical space having a defined perimeter.

FIG. 3 illustrates an example physical space having a defined perimeter 300. FIG. 3 shows a wireless node 60 and a perimeter 300. In one implementation, the perimeter 300 may, for example, correspond to the walls of a building. However, the perimeter may be any arbitrarily defined region. The location server 22 determines whether the wireless node 60 is located inside or outside the perimeter 300 based on an inside/outside probability ratio. The probability ratio is the probability that the wireless node 60 is outside a defined perimeter (Pout) over the probability that the wireless node 60 is inside the defined perimeter (Pin). In one implementation, if the probability ratio is such that Pout/Pin>1, the location server 22 will estimate that the wireless node is outside the defined perimeter. In contrast, in one implementation, if the probability ratio is such that Pout/Pin<1, the location server 22 will estimate that the wireless node is inside the defined perimeter.

C.1. Relative Location of a Wireless Client

Figure 4:
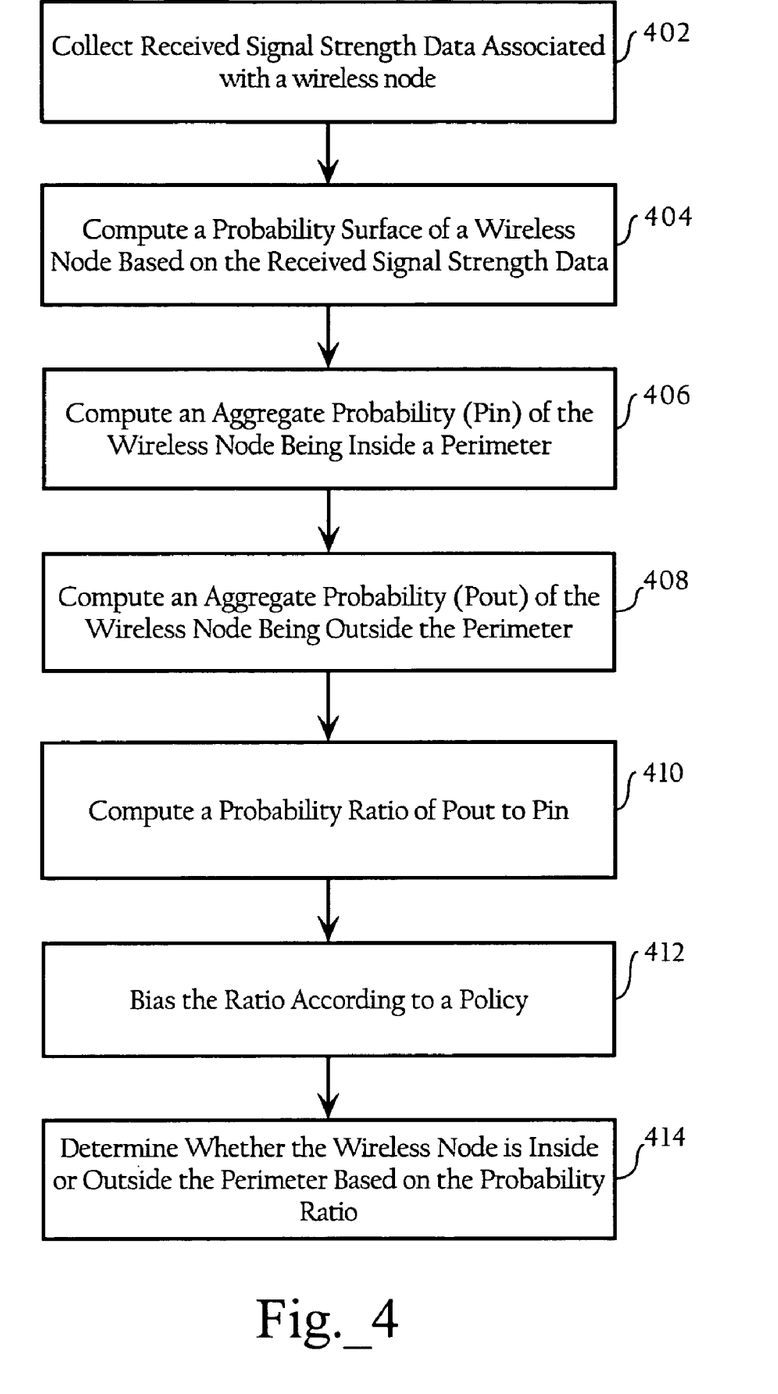
FIG. 4 illustrates an example method associated with determining the relative location of a wireless node.

FIG. 4 illustrates an example method associated with determining the relative location of a wireless node (e.g., relative to the perimeter 300 of a building). As FIG. 4 illustrates, the location server 22 collects received signal strength data associated with a wireless node (402). In one implementation, the location server 22 may utilize radio frequency (RF) coverage maps, based upon estimated client transmission power, wireless access point location, height, azimuth angle, elevation angle, antenna pattern and/or a pathloss model. The pathloss model may be some average pathloss model or one determined from a calibration survey throughout a building or to some distance beyond the perimeter of the building. In one implementation, the location server 22 may also utilize interpolated RF coverage maps calculated using a calibration survey performed inside and/or outside the building perimeter. RF coverage maps are described in more detail below in connection with FIGS. 6 and 7.

The location server 22 then computes a probability surface corresponding to the location probability of the wireless node within a physical region based on the received signal strength data associated with a wireless node and an RF model of the physical region (404). In one implementation, the location server 22 may optionally compute a normalized probability surface. One implementation for computing a normalized probability surface is described in more detailed below in connection with FIG. 5. The location server 22 then computes the aggregate probability (Pin) of the wireless node 60 being inside the perimeter 300 defined with the physical region based on the probability surface (406). In one implementation, the aggregate probability Pin is a sum of the probability values inside the perimeter. The location server 22 then computes the aggregate probability (Pout) of the wireless node 60 being outside the perimeter 300 based on the probability surface (408). In one implementation, the aggregate probability Pout is a sum of the probability values outside the perimeter.

The location server 22 then computes a probability ratio of the aggregate probability (Pin) of the wireless node 60 being inside the perimeter 300 to aggregate probability (Pout) of the wireless node 60 being outside the perimeter 300 based on the probability surface (410). In other words, the location server 22 computes Pout/Pin.

In one implementation, the location server 22 may optionally bias the probability ratio, where the probability ratio may be biased, based on a predefined policy (412). In one implementation, the predefined policy may be to either increase the probability that a given wireless node is inside a perimeter or increase the probability that a given wireless node is outside a perimeter, as illustrated in the following examples. In one implementation, the aggregate probability (Pin) of the wireless node being inside the perimeter may biased higher (e.g., given a greater weight) in order to determined some borderline wireless nodes to be inside the perimeter. In other words, it may be desirable to not mistakenly declare some wireless nodes to be outside a building when they are in fact inside. For example, a wireless node may belong to an executive where the cost of mistakenly declaring such a wireless node to be outside the building and consequently disconnecting the wireless node from the network would be considered too high, according to the policy. In other words, it may be more important to avoid frustrating legitimate users than to foil hackers.

In one implementation, the location server 22 may apply a bias globally or relative to a particular wireless access point. In one implementation, if the bias is applied globally, the location server 22 applies the same bias to all wireless access points inside the perimeter. In one implementation, if the bias is based on a particular wireless access point, each wireless access point would have an associated bias, where the location server 22 determines the closest wireless access point (e.g., the wireless access point receiving the strongest signals from the wireless node), and then applies the bias associated with that access point. For example, in the scenario described above, a given wireless access point may be located in an executive wing of a building. Accordingly, that wireless access point could be associated with a bias that favors declaring the wireless node of the executive to be inside rather that outside. Other wireless access points in the same building may be associated with different biases.

In one implementation, the aggregate probability (Pout) of the wireless node being outside the perimeter may be biased higher in order to declare some borderline wireless nodes to be outside the perimeter. In other words, it may be desirable to not mistakenly declare some wireless nodes to be inside the building when they are in fact outside. For example, a particular building may be high-security building such as a bank, where there the policy may place a high cost on mistakenly declaring a rogue wireless node to be inside a building, where the rogue wireless node is actually outside the building.

Referring again to FIG. 4, the location server 22 then determines whether the wireless node is inside or outside the perimeter 300 based on the probability ratio (414). As describe above, in one implementation, if the probability ratio is such that Pout/Pin>1, the location server 22 will render the wireless node to be outside the perimeter, and if the probability ratio is such that Pout/Pin<1, the location server 22 will render the wireless node to be inside the perimeter. Based on the determination, an appropriate node of the wireless network infrastructure (e.g., WLAN management server 20) may either permit continual connection to the wireless network if the wireless node is determined to be inside the perimeter or else disconnect the wireless node from the wireless network.

C.2. Normalized Probability Surface

Figure 5:
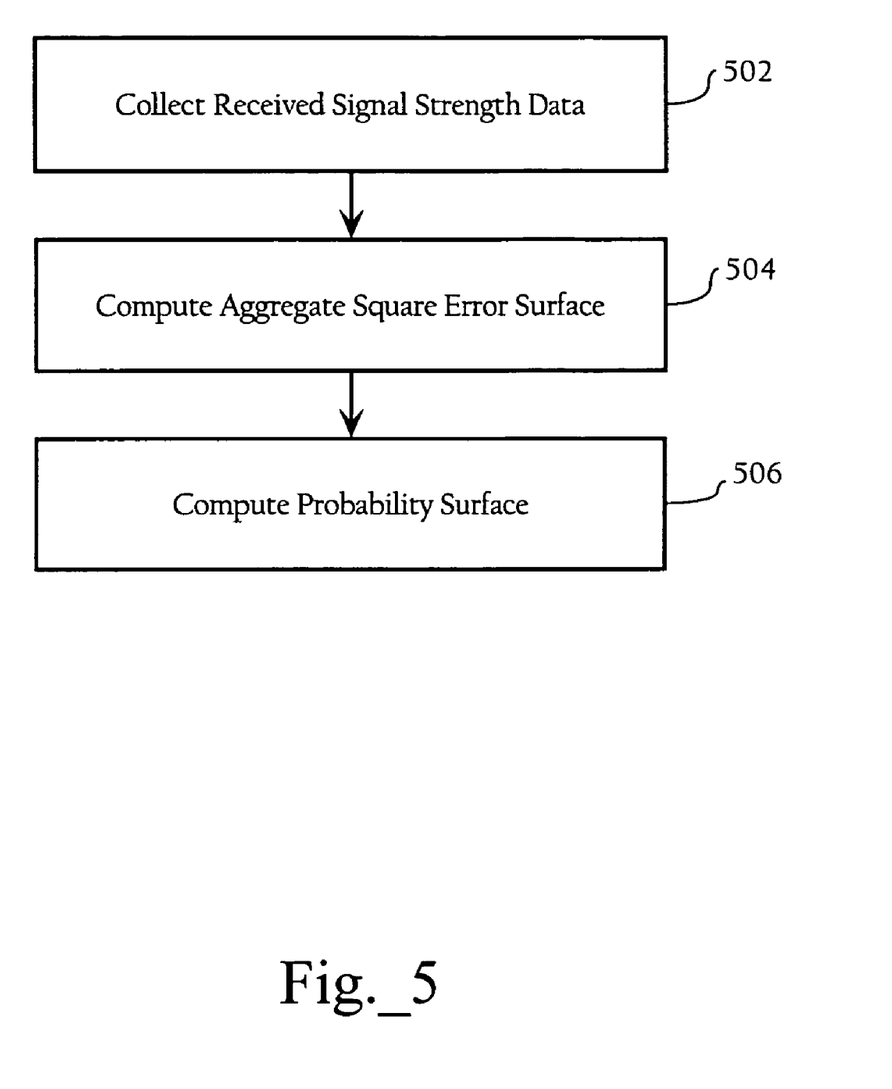
FIG. 5 illustrates an example method associated with computing a normalized probability surface.

FIG. 5 illustrates an example method associated with computing a normalized probability surface. As FIG. 5 shows, the location system collects received signal strength data (502). Collection of received signal strength data, according to one example implementation, is described in following sections. Next, the location system computes an aggregate square error surface based on the received signal strength data (504). One implementation for computing an aggregate square error surface is discussed in more detail below in connection with FIG. 7. The aggregate error surface characterizes the aggregate square error or difference between the received signal strength, $SS_i$, detected by infrastructure radio transceivers and the expected received signal strength values in the coverage maps corresponding to the infrastructure radio transceivers.

Next, the location system computes a probability surface by computing a probability density function (Pu) from the aggregate error surface (506). In one implementation, the unnormalized probability density function (Pu) may be described using the following equation:

$$Pu(x, y) = \exp\left(-\frac{1}{2\sigma^2} S(x, y)\right),$$

where e is Euler's number, σ is the standard deviation of the residual errors (e.g., measured pathloss less the estimated pathloss based on calibration values or a default value (e.g., by default sigma equals 7)), and S(x,y) represents the value of an error surface at a given location bin (x,y). In one implementation, the location system computes the probability function for each location bin in the aggregate error surface. The Pu represents the unnormalized probability density that the wireless node is at a given location. Accordingly, lower aggregate square error values for a given location bin result in higher probability values.

In one embodiment, the location system normalizes the probability surface such that the sum of the probabilities over the entire surface equals one. The normalized probability surface may be described using the following equation:

$$P(x,y)=Pu(x,y)/\Sigma Pu(x,y).$$

C.3. Infrastructure Radio Transceivers and Received Signal Strength

Figure 6:
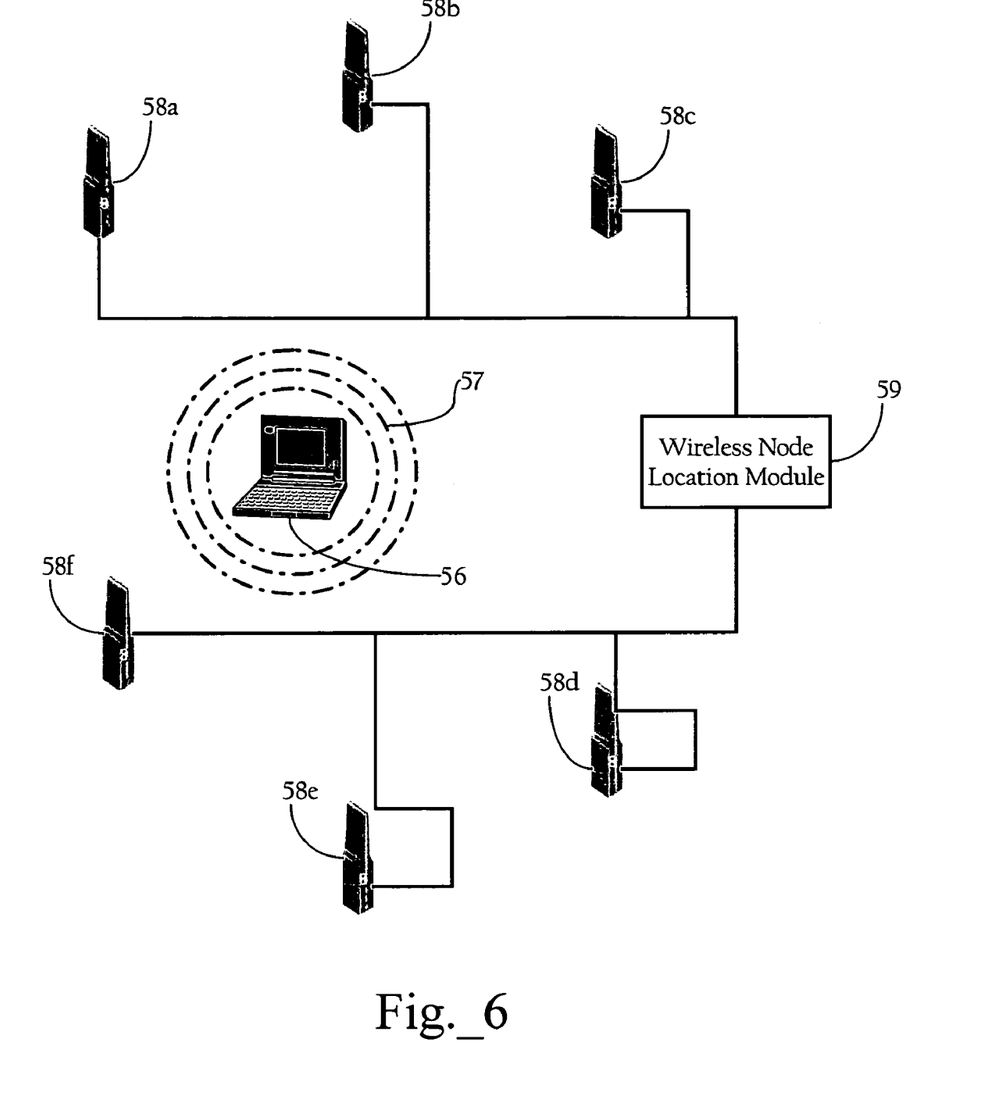
FIG. 6 illustrates an example wireless node location mechanism.

FIG. 6 illustrates an example wireless node location mechanism. As FIG. 6 shows, the wireless node location mechanism includes a wireless node location module 59 and a plurality of infrastructure radio transceivers 58a, 58b, 58c, 58d, 58e, and 58f disposed throughout a physical space. One skilled in the art will recognize that the system depicted in FIG. 1 represents an example of the basic components of the invention and is mostly for didactic purposes. As discussed more fully below, the functionality generally denoted by infrastructure radio transceivers 58 and wireless node location module 59 can be integrated into a variety of systems, such as wireless systems dedicated for location of wireless nodes, or WLAN or other wireless network systems.

Infrastructure radio transceivers 58 are operative to detect the strength of received radio-frequency signals, such as the signals 57 transmitted by wireless node 56 and by other radio transceivers, and provide the detected signal strength data for corresponding wireless nodes to wireless node location module 59. In one implementation, infrastructure radio transceivers 58 are also operative to transmit and receive wireless or radio-frequency signals according to a wireless communications protocol, such as the IEEE 802.11 WLAN protocol. Infrastructure radio transceivers 58, in one implementation, can operate on a selected channel from a plurality of channels in a given band. In another implementation, infrastructure radio transceivers 58 can also operate in more than one band. For example, infrastructure radio receivers 58 may be configured to operate in the 802.11a-5 GHz band, and/or the 802.11b/g-2.4 GHz band. In one implementation, infrastructure radio transceivers 58 can be configured to collect the signal strength information associated with wireless nodes and transmit the collected data in response to SNMP or other requests by wireless node location module 59. In other implementations, the infrastructure radio transceivers 58 can transmit signal strength information on a regular or periodic basis. As discussed below, other methods for collecting signal strength data may also be employed.

Identification of wireless nodes depends on the wireless communications protocol in use. For 802.11 WLAN environments, for example, wireless nodes can be identified based on MAC address. Furthermore, wireless nodes can be authorized mobile stations, such as remote client elements 60a-60d (see FIG. 1), rogue systems (e.g., rogue access points and/or rogue mobile stations), as well as authorized access points for which no location information is known. In other implementations, wireless nodes can be identified based on a unique property of the RF signal, such as a given frequency channel, or a unique signal pattern, and the like. For example, the wireless node location functionality may be employed to locate a detected source of interference, such as a non-802.11 compliant device.

In one implementation, infrastructure radio transceivers 58 are also operable to communicate with one or more mobile stations, such as wireless node 56, according to a wireless communication protocol. For example, radio transceiver 58, in one implementation, is an access point or other WLAN component. In one implementation, radio transceiver 58 is operably connected to a Local Area Network (LAN), Wide Area Network (WAN) or other wireline network to bridge traffic between mobile stations and the wireline network. As discussed more fully below, radio transceiver 58 may also be an access point or light weight access point in a wireless network featuring hierarchical processing of protocol information. In one implementation, the radio transceiver 58 implements the 802.11 protocols (where 802.11, as used herein, generically refers to the IEEE 802.11 standard for wireless LANs and all its amendments). Of course, the present invention can be used in connection with any suitable radio-frequency-based wireless network or communications protocol.

In one implementation, infrastructure radio transceivers 58 make use of the signal strength detection functionality residing on a wireless network interface adapter to detect signal strength on a frame-by-frame basis. For example, the IEEE 802.11 standard defines a mechanism by which RF energy is measured by the circuitry (e.g., chip set) on a wireless network interface controller. The IEEE 802.11 protocol specifies an optional parameter, the receive signal strength indicator (RSSI). This parameter is a measure by the PHY layer of the energy observed at the antenna used to receive the current packet or frame. This numeric value is an integer with an allowable range of 0-255 (a 1-byte value). Typically, 802.11 chip set vendors have chosen not to actually measure 256 different signal levels. Accordingly, each vendor's 802.11-compliant adapter has a specific maximum RSSI value ("RSSI_Max"). Therefore, the RF energy level reported by a particular vendor's wireless network adapter will range between 0 and RSSI_Max. Resolving a given RSSI value reported by a given vendor's chip set to an actual power value (dBm) can be accomplished by reference to a conversion table. In addition, some wireless networking chip sets actually report received signal strength in dBm units, rather than or in addition to RSSI. Other attributes of the signal can also be used in combination with received signal strength or as an alternative. For example, the detected Signal-to-Noise Ratio (SNR) during packet reception can be used in determining overlay signal transmit power. Again, many chip sets include functionality and corresponding APIs to allow for a determination of SNRs associated with packets received from wireless node 56. The resulting signal strength information, in one implementation, can be associated with a time stamp corresponding to the receipt of the frame. As discussed herein, this signal strength information can be collected at each infrastructure radio transceiver 58 and/or the wireless node location module 59 in suitable data structures.

Wireless node location module 59, in one implementation, collects signal strength data received from infrastructure radio transceivers 58 and maintains the signal strength data in association with a wireless node identifier, and an identifier for the particular infrastructure radio transceiver 58 and antenna which provided the signal strength data. Wireless node location module 59, in one implementation, is also configured to distinguish between signals received from infrastructure radio transceivers 58 and signals received from other wireless nodes based on the wireless node identifier. In one implementation, wireless node location module 59 maintains a variety of data structures for storing signal strength information. Wireless node location module 59, in one implementation, maintains signal strength data for all other wireless nodes in tables or other suitable data structures. In one implementation, wireless node location module 59 maintains, for each antenna of each radio transceiver 58, a separate table including at least two fields: 1) a wireless node identifier; 2) the detected signal strength. Additional fields may also include a time stamp indicating the time the infrastructure radio transceiver 58 received the signal. In one implementation, when the memory space allocated to the wireless node tables is depleted, the least recently used/updated entry as indicated by the time stamps is overwritten. In the case that all entries are recent, the weakest RSSI may be overwritten instead. In one implementation, wireless node location module 59 filters the signal strength data received from the infrastructure radio transceivers 58 against a list of wireless node identifiers in order to identify the appropriate data structure to update. One skilled in the art will recognize that a variety of data structures beyond matrices and tables can be used.

As discussed above, signal strengths are detected, in one implementation, on a frame-by-frame basis. Accordingly, in one embodiment, the signal strength data maintained by wireless node location module 59 can be updated as the frames/packets are received. In one implementation, the latest signal strength value is used to essentially overwrite the old value. In other implementations, however, an average, moving average, weighted moving average, or time-weighted moving average can be used if successive wireless frames corresponding to a given wireless node are encountered within a threshold time interval (e.g., typically resulting from a data stream transmission). In such a situation, the time stamp can correspond to the time of the last packet or frame. In addition, while radio transceivers 58 when operating as access points typically operate on different channels, mobile stations at various times (e.g., transmitting probe requests to find access points) transmit wireless frames on all available operating channels. This helps to ensure that a plurality of infrastructure radio transceivers 58 detect the mobile station. In some implementations, one or more infrastructure radio transceivers 58 that are adjacent to a radio transceiver 58 that detected a given wireless node may be directed to switch to a given operating channel to listen for signals transmitted by the mobile station. Still further, as discussed below, the infrastructure radio transceivers 58 may be commanded to specifically transmit frames on a given channel for the purpose of updating the signal strength data maintained by wireless node location module 59.

C.4. Aggregate Error Surface

Wireless node location module 59 also maintains a RF physical model of the coverage area associated with the RF environment. In one implementation, the RF physical model includes a plurality of coverage maps. Each coverage map characterizes for a given infrastructure radio transceiver and antenna 58 the expected received signal strength associated with a wireless transmitter at a given location. For example, in one implementation, the RF physical model comprises, for each antenna, a radio coverage map or matrix that indicates the expected signal strength detected at an infrastructure radio transceiver received from a wireless node, assuming a uniform transmit power, at a given location defined in x-, and y-coordinates. This database can be populated in a variety of ways. For example, the radio coverage maps can be populated with the results of an extensive site survey, according to which a wireless transmitter is placed at different locations in the physical space. During the site survey, the infrastructure radio transceivers 58 operate in a listening mode that cycles between the antennas and report the resulting signal strength of the signal transmitted by the wireless node used to conduct the site survey. In one implementation, the infrastructure radio transceivers 58 can be configured to transmit the signal strength data back to the wireless transmitter, which may be a laptop computer or other wireless device. The coverage maps are constructed by associating the signal strength and location data in the coverage maps corresponding to each infrastructure radio transceiver. The coverage maps may also be constructed by having a WLAN tester (or other wireless node) simply measure the signal strength of frames transmitted by the infrastructure radio transceivers 58 (e.g., beacon packets) at desired locations within the deployment region. If path loss symmetry is assumed, these values can be used to construct the coverage maps for each of the infrastructure radio transceivers. Still further, locations in the coverage map not populated by manual methods can be estimated based on interpolation or extrapolation techniques.

In one implementation, a coverage map, for each infrastructure radio transceiver 58, is maintained that includes the signal strengths in an N×M matrix of location bins, where N is the number of x-coordinates in the coverage map, and M is the number of y-coordinates in the coverage map. In another implementation, the coverage map is a three dimensional N×M×P matrix of location bins, where P is the number of z-coordinates in the coverage map. In one implementation, the extent of the physical space model by the coverage maps for each infrastructure radio transceiver 58 are co-extensive. The coverage maps for all infrastructure radio transceivers 58 can be co-extensive with the physical space in which the location system is deployed, or with a boundary configured by a network administrator. In one implementation, however, knowledge of various antenna attributes associated with each infrastructure radio transceiver 58—such as antenna type (e.g., omni-directional, directional), peak gain orientation, beamwidth, front-to-back isolation—can be used to compress or reduce the size of the coverage maps. In one implementation, the coverage maps can be configured to be substantially coextensive with the antenna pattern of each antenna connected to the infrastructure radio transceivers 58 out to a threshold signal strength or gain level. For example, the coverage map for a given antenna can be compressed to the front or intended coverage area of the directional antenna. In addition, if the coverage maps are compressed, the search for the best fit across selected coverage maps can be isolated to the overlap between coverage maps associated with the antennas selected to locate the wireless node.

In another implementation, the coverage maps of the RF physical model may be constructed using RF prediction to model the coverage area, employing mathematical techniques like ray-tracing, and the like. In one implementation, the RF prediction model can be computed for each coordinate location in a desired physical space, assuming a uniform wireless node transmit power. The estimated signal strength information for each infrastructure radio transceiver 58 can be used to populate the coverage maps discussed above. In an alternative embodiment, RF prediction models can be computed relative to each infrastructure radio transceiver antenna. If path loss symmetry and transmit power symmetry between the wireless nodes and the infrastructure radio transceivers 58 are assumed, the coverage maps for each infrastructure radio transceiver antenna can be populated by using the computed values at each of the coordinate locations in the coverage map. Of course, site survey data can also be used to adjust one or more parameters associated with the RF prediction model used to estimate expected signal strength at the various locations. As above, the boundaries of the coverage maps can be contoured based on the properties of the antennas connected to the infrastructure radio transceivers 58. In addition, the location coordinates in the coverage maps can be two-dimensional, x- and y-coordinates, defining location in a horizontal plane, or three dimensional, x-, y- and z-coordinates, defining location in three dimensions. In addition, the values of the coordinates can be either global (i.e., longitude and latitude) or expressed relative to an arbitrarily-defined origin. In addition, the granularity of the coordinates in the coverage maps depends on the desired granularity of the wireless node location estimates.

Figure 7:
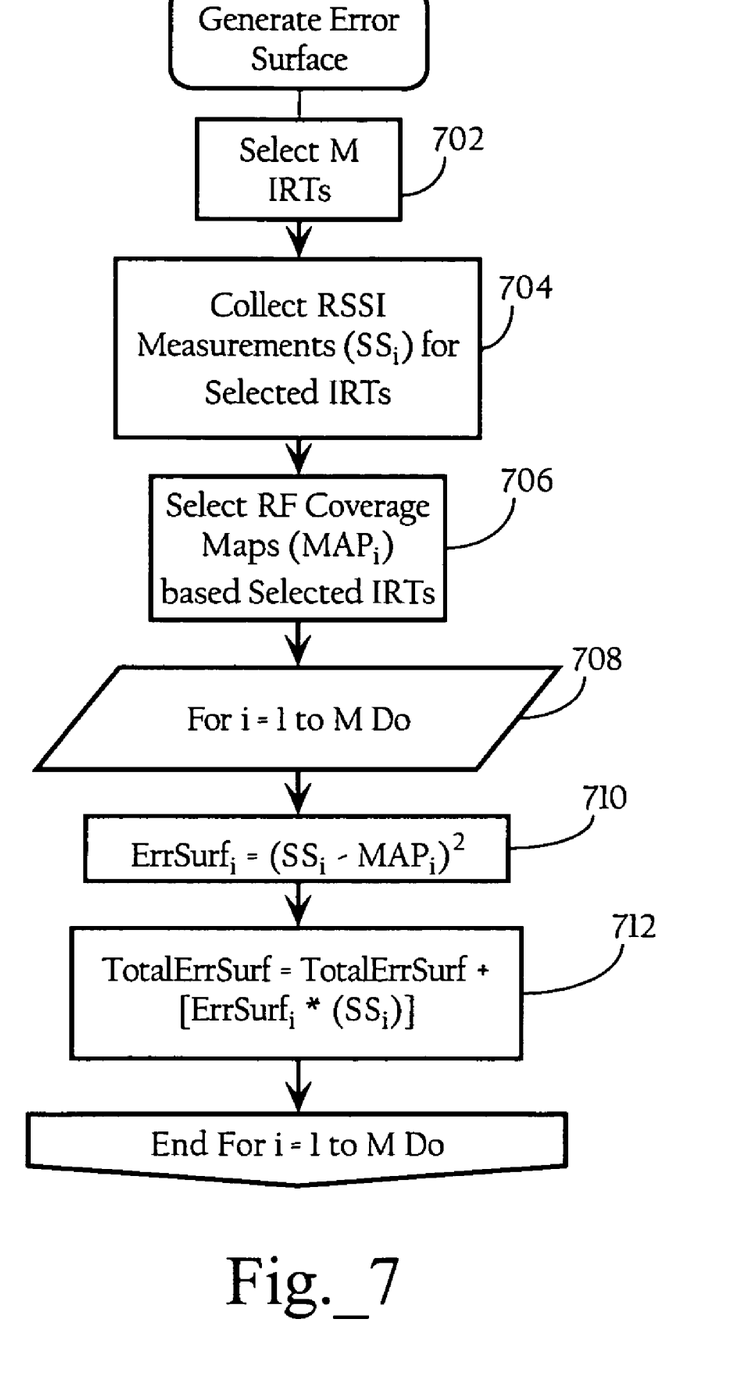
FIG. 7 illustrates an example method associated with computing an aggregate error surface.

FIG. 7 illustrates an example method associated with generating an aggregate error surface. The wireless node location functionality can be triggered on demand, for example, in response to a command issued by a network administrator using a control interface to locate a mobile station identified by a MAC address or other suitable identifier, such as an arbitrary name associated with a MAC address in a table or other data structure. Wireless node location module 59 may also be triggered automatically in response to the detection of a rogue access point. Wireless node location module 59 can also be configured to periodically determine the location of a given mobile station in order to track its movement over a period of time.

As FIG. 5 illustrates, wireless node location module 59, in one implementation, begins by selecting the infrastructure radio transceivers (IRTs) 58 whose signal measurements will be used in locating the desired wireless node (702). In one implementation, wireless node location module 59 scans the data structures discussed above to identify the infrastructure radio transceivers 58 that see or detect wireless frames transmitted by the desired wireless node. In implementations where signal strength data is regularly collected (as opposed to on demand), the time stamps in the data structures can be used to filter out infrastructure radio transceivers 58 that have not detected the desired wireless node within a threshold period of time. Additional or alternative filter criteria can include a threshold signal strength level (such as −80 dBm). In the implementation shown, wireless node location module 59 selects the M infrastructure radio transceivers 58 that report the strongest signal strengths (where M is a configurable parameter). In one implementation, if an insufficient number of infrastructure radio transceivers 58 are identified, wireless node location module 59 can command the infrastructure radio transceivers 58 to actively scan for the desired wireless node and return signal strength information. Wireless node location module 59 collects the signal strength (e.g., RSSI) measurements corresponding to the selected infrastructure radio transceivers 58 (704), and identifies the RF coverage maps to be used in estimating the location of the wireless node based on selected infrastructure radio transceivers 58 (706).

As FIG. 5 shows, wireless node location module 59, for all selected infrastructure radio transceivers (708), computes, for each point in the coverage map, $MAP_i$, an error surface, $ErrSurf_i$, characterizing the difference between the signal strength, $SS_i$, detected by the infrastructure radio transceiver and the value in the corresponding coverage map (710). To neutralize positive and negative errors, wireless node location module 59, in one implementation, uses the square of the error for each point in the error surface. As FIG. 5 illustrates, wireless node location module 59 sums the individual error surfaces, $ErrSurf_i$, to create a total error surface, TotalErrSurf, for all points for which the error surfaces overlap (712).

Figure 8:
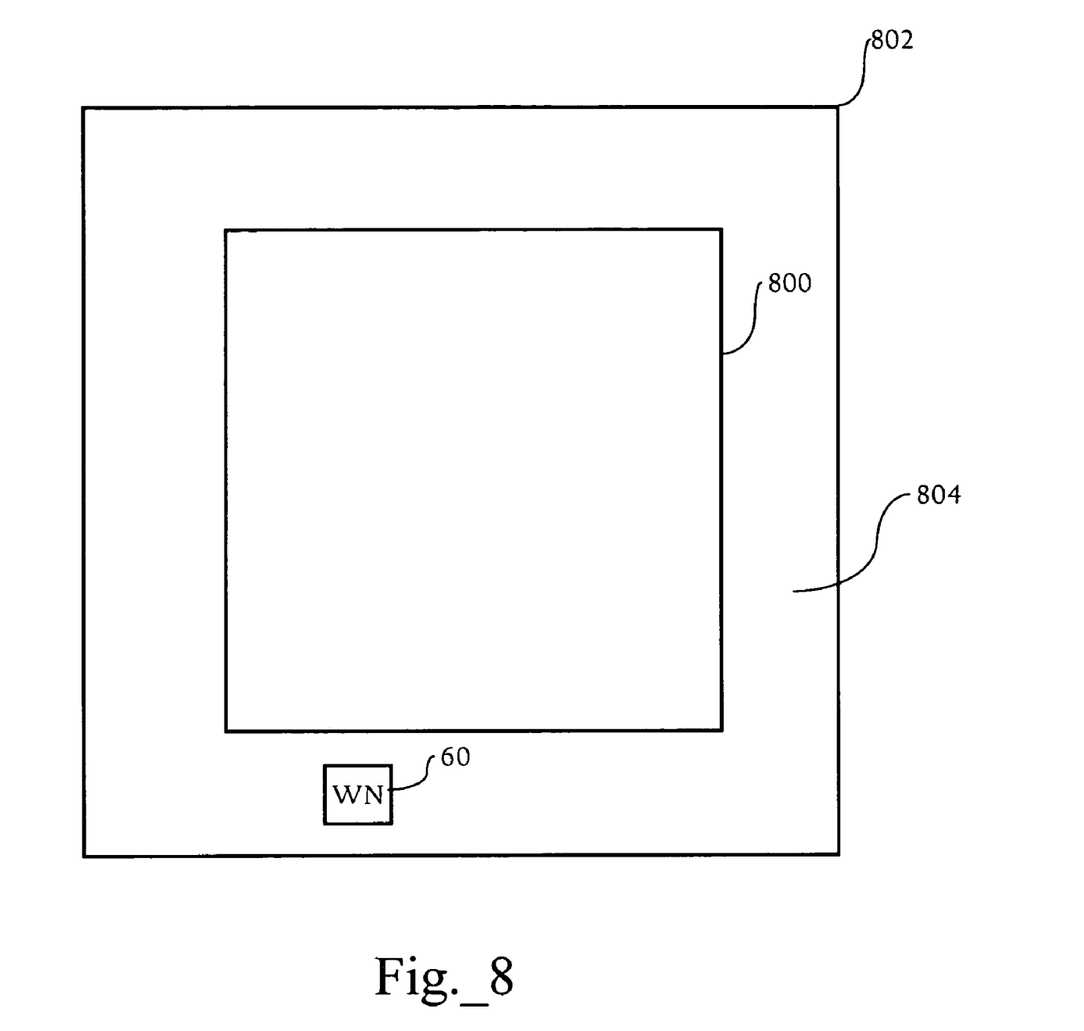
FIG. 8 illustrates an example physical space having two defined perimeters and an exclusion region.

FIG. 8 illustrates an example physical space having two defined perimeters 800 and 802 and an exclusion region 804 between the perimeters 800 and 802. FIG. 8 shows a wireless node 60 in the exclusion region. In one implementation, wireless nodes inside the building may be considered trusted (i.e., a legitimate wireless node having permission to connection to the wireless network) and wireless nodes outside the building and outside the exclusion region are untrusted (e.g., potentially a rogue wireless node).

In one implementation, location server 22 excludes bin probabilities within the exclusion region 804 when computing the probability aggregates Pin and Pout (FIG. 4). In other words, the location server 22 ignores the possibility that wireless nodes might be located within the exclusion region 804 (i.e., between perimeters 800 and 802) such as wireless node 60, as shown. The presumption is that rogue wireless nodes (e.g., hackers) would typically not approach a building too closely, as they would become vulnerable to conventional means of detection.

In one implementation, the location server 22 may modify the size of the exclusion region 804 to bias the probability ratio. For example, a wider exclusion region 804 decreases the probability that a given wireless node will be determined to be inside the perimeter 800. Accordingly, a wireless node inside the exclusion region would have no guarantee of coverage (e.g., may be denied coverage).

The present invention has been explained with reference to specific embodiments. For example, while embodiments of the present invention have been described as operating in connection with IEEE 80211 networks, the present invention can be used in connection with any suitable wireless network environment. Other embodiments will be evident to those of ordinary skill in the art. It is therefore not intended that the present invention be limited, except as indicated by the appended claims.

What is claimed is:

1. A computer-readable medium encoded with computer-executable instructions, the computer-executable instructions, when executed operable, to cause one or more processors to:

compute a probability surface corresponding to the location probability of a wireless node within a physical region based on a received signal strength data associated with the wireless node and a Radio Frequency (RF) model of the physical region;

compute, based on the probability surface, an aggregate probability (Pin) of the wireless node being inside a perimeter defined with the physical region;

compute, based on the probability surface, an aggregate probability (Pout) of the wireless node being outside the perimeter; and determine whether the wireless node is inside or outside the perimeter based on a comparison of Pout and Pin; and output to a network access control node an indication of whether the wireless node has been determined to be inside or outside the perimeter.

2. The computer-readable medium of claim 1 wherein the computer-executable instructions are further operable to cause the one or more processors to determine whether the wireless node is inside or outside the perimeter based on whether Pin or Pout is larger.

3. The computer-readable medium of claim 1 wherein, to determine whether the wireless node is inside or outside the perimeter, the computer-executable instructions are further operable to cause the one or more processors to compute a probability ratio of the aggregate probabilities Pin to Pout.

4. The computer-readable medium of claim 1 wherein computer-executable instructions are further operable to cause the one or more processors to:

compute a probability ratio based on Pin and Pout; and bias the probability ratio based on a predefined policy.

5. The computer-readable medium of claim 4 wherein the predefined policy either increases the probability that a given wireless node is inside the perimeter or increases the probability that a given wireless node is outside the perimeter.

6. The computer-readable medium of claim 4 wherein the computer-executable instructions are further operable to cause the one or more processors to bias the probability ratio globally to all wireless access points inside the perimeter.

7. The computer-readable medium of claim 4 wherein the computer-executable instructions are further operable to cause the one or more processors to bias the probability ratio relative to a given wireless access point.

8. The computer-readable medium of claim 4 wherein the computer-executable instructions are further operable to cause the one or more processors to exclude probabilities from bins within an exclusion region when computing the aggregate probabilities Pin and Pout.

9. The computer-readable medium of claim 8 wherein the computer-executable instructions are further operable to cause the one or more processors to modify the size of the exclusion region to bias the probability ratio.

10. A method comprising:

computing, in a computing device, a probability surface corresponding to the location probability of a wireless node within a physical region based on the received signal strength data associated with the wireless node and a Radio Frequency (RF) model of the physical region;

computing, based on the probability surface, an aggregate probability (Pin) of the wireless node being inside a perimeter defined with the physical region;

computing, based on the probability surface, an aggregate probability (Pout) of the wireless node being outside the perimeter; and determining whether the wireless node is inside or outside the perimeter based on a comparison of Pout and Pin.

11. The method of claim 10 wherein the determining is based on whether Pin or Pout is larger.

12. The method of claim 10 wherein, to determine whether the wireless node is inside or outside the perimeter, the method further comprises computing a probability ratio of the aggregate probabilities Pin to Pout.

13. The method of claim 10 further comprising:
computing a probability ratio based on Pin and Pout; and
biasing the probability ratio based on a predefined policy.

14. The method of claim 13 wherein the predefined policy either increases the probability that a given wireless node is inside the perimeter or increases the probability that a given wireless node is outside the perimeter.

15. The method of claim 13 further comprising biasing the probability ratio globally to all wireless access points inside the perimeter.

16. The method of claim 13 further comprising biasing the probability ratio relative to a given wireless access point.

17. The method of claim 13 further comprising excluding probabilities from bins within an exclusion region when computing the aggregate probabilities Pin and Pout.

18. The method of claim 17 further comprising modifying the size of the exclusion region to bias the probability ratio.

19. A system comprising:
a location server operable to compute a probability surface corresponding to the location probability of a wireless node within a physical region based on the received signal strength data associated with the wireless node and a Radio Frequency (RF) model of the physical region; compute, based on the probability surface, an aggregate probability (Pin) of the wireless node being inside a perimeter defined with the physical region; compute, based on the probability surface, an aggregate probability (Pout) of the wireless node being outside the perimeter; and determine whether the wireless node is inside or outside the perimeter based on a comparison of Pout and Pin; and
a wireless access point operable to communicate with a wireless node.

20. The system of claim 19 wherein the location server is further operable to determine whether the wireless node is inside or outside the perimeter based on whether Pin or Pout is larger.

21. The system of claim 19 wherein, to determine whether the wireless node is inside or outside the perimeter, the location server is further operable to compute a probability ratio of the aggregate probabilities Pin to Pout.

22. The system of claim 19 wherein the location server is further operable to:
compute a probability ratio based on Pin and Pout; and
bias the probability ratio based on a predefined policy.

23. The system of claim 22 wherein the predefined policy either increases the probability that a given wireless node is inside the perimeter or increases the probability that a given wireless node is outside the perimeter.

24. The system of claim 22 wherein the location server is further operable to bias the probability ratio globally to all wireless access points inside the perimeter.

25. The system of claim 22 wherein the location server is further operable to bias the probability ratio relative to a given wireless access point.

26. The system of claim 22 wherein the location server is further operable to exclude probabilities from bins within an exclusion region when computing the aggregate probabilities Pin and Pout.

27. The system of claim 26 wherein the location server is further operable to modify the size of the exclusion region to bias the probability ratio.

* * * * *

UNITED STATES PATENT AND TRADEMARK OFFICE
CERTIFICATE OF CORRECTION

PATENT NO. : 7,626,969 B2  Page 1 of 1
APPLICATION NO. : 11/542739
DATED : December 1, 2009
INVENTOR(S) : Hart et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 396 days.

Signed and Sealed this

Second Day of November, 2010

David J. Kappos
*Director of the United States Patent and Trademark Office*